(12) United States Patent
Meriaz et al.

(10) Patent No.: US 11,418,649 B1
(45) Date of Patent: Aug. 16, 2022

(54) INBOUND AND OUTBOUND COMMUNICATION SESSION AND CALL CONTROL

(71) Applicant: MBTE Holdings Sweden AB, Goeteborg (SE)

(72) Inventors: Yoram Meriaz, Tel Aviv (IL); Ran Meriaz, Atlanta, GA (US); Alex Tkachman, Holon (IL)

(73) Assignee: MBTE Holdings Sweden AB, Goeteborg (SE)

( * ) Notice: Subject to any disclaimer, the term of this patent is extended or adjusted under 35 U.S.C. 154(b) by 0 days.

(21) Appl. No.: 17/408,205

(22) Filed: Aug. 20, 2021

(51) Int. Cl.
  *H04M 3/42* (2006.01)
  *H04W 4/16* (2009.01)
  *H04M 3/523* (2006.01)

(52) U.S. Cl.
  CPC ..... *H04M 3/5231* (2013.01); *H04M 3/42136* (2013.01); *H04W 4/16* (2013.01); *H04M 3/42382* (2013.01)

(58) Field of Classification Search
  None
  See application file for complete search history.

(56) References Cited

U.S. PATENT DOCUMENTS

| | | | |
|---|---|---|---|
| 5,758,286 | A | 5/1998 | Leppanen |
| 6,456,234 | B1 | 9/2002 | Johnson |
| 6,501,948 | B1 | 12/2002 | Salin |
| 7,103,151 | B2 | 9/2006 | Lass et al. |
| 7,197,321 | B2 | 3/2007 | Erskine et al. |
| 7,272,392 | B2 | 9/2007 | Boda |
| 7,353,016 | B2 | 4/2008 | Roundtree et al. |
| 7,362,698 | B2 | 4/2008 | Christensen et al. |
| 7,545,760 | B1 | 6/2009 | Daniel et al. |
| 7,548,915 | B2 | 6/2009 | Ramer et al. |
| 7,710,290 | B2 | 5/2010 | Johnson |

(Continued)

FOREIGN PATENT DOCUMENTS

| | | |
|---|---|---|
| EP | 1435720 A2 | 7/2004 |
| WO | WO-2010/073237 A2 | 7/2010 |

(Continued)

OTHER PUBLICATIONS

International Preliminary Examining Authority, International Preliminary Report on Patentability for International Application No. PCT/US2014/036306, dated Jul. 10, 2015, (16 pages), European Patent Office, Rijswijk, The Netherlands.

(Continued)

*Primary Examiner* — Harry S Hong
(74) *Attorney, Agent, or Firm* — Alston & Bird LLP (57) ABSTRACT

Computer program products, methods, systems, apparatus, and computing entities are provided for establishing supplemental communication sessions between a caller and callee of a voice-based telephone call. The supplemental communication sessions may occur via a unique URL generated for a call and provided to a mobile device participating in the telephone call. By accessing the URL, the mobile device user has access to content tailored specifically to the telephone call, such as a dynamically updated indication of a callback time estimate if the mobile device user requested a callback when a representative of a third party is available to participate in a callback.

20 Claims, 7 Drawing Sheets

(56) References Cited

U.S. PATENT DOCUMENTS

| | | |
|---|---|---|
| 8,036,160 B1 | 10/2011 | Oakes, III |
| 8,238,922 B2 | 8/2012 | Parameswar |
| 8,243,724 B2 | 8/2012 | Meriaz et al. |
| 8,275,102 B2 | 9/2012 | Zheng et al. |
| 8,275,352 B2 | 9/2012 | Forstall et al. |
| 8,295,801 B2 | 10/2012 | Ray et al. |
| 8,498,290 B2 | 7/2013 | Hughston |
| 8,588,214 B2 | 11/2013 | Meriaz et al. |
| 8,644,485 B1 | 2/2014 | Vendrow et al. |
| 8,837,696 B2 | 9/2014 | Meriaz et al. |
| 8,964,731 B2 | 2/2015 | Meriaz et al. |
| 9,596,566 B2 | 3/2017 | Meriaz et al. |
| 9,730,053 B2 | 8/2017 | Meriaz et al. |
| 9,813,898 B2 | 11/2017 | Meriaz et al. |
| 9,961,195 B2 | 5/2018 | Meriaz et al. |
| 10,708,434 B1* | 7/2020 | Scheet ............... H04W 4/14 |
| 2002/0077085 A1 | 6/2002 | Kalish et al. |
| 2004/0052346 A1 | 3/2004 | Ohta et al. |
| 2004/0185824 A1 | 9/2004 | Cheng |
| 2004/0266422 A1 | 12/2004 | Hotze et al. |
| 2007/0274495 A1* | 11/2007 | Youd ............... H04M 3/5238 379/210.01 |
| 2008/0133580 A1 | 6/2008 | Wanless et al. |
| 2008/0205608 A1 | 8/2008 | Tai et al. |
| 2008/0261603 A1 | 10/2008 | Sever et al. |
| 2009/0046843 A1 | 2/2009 | Baciu et al. |
| 2009/0262733 A1 | 10/2009 | Olson |
| 2011/0176670 A1* | 7/2011 | Kaplan ............ H04M 1/72451 455/414.1 |
| 2011/0249666 A1 | 10/2011 | Holbrook et al. |
| 2013/0013750 A1 | 1/2013 | Butler et al. |
| 2013/0210393 A1 | 8/2013 | Hillier |
| 2014/0329514 A1 | 11/2014 | Meriaz et al. |
| 2016/0037297 A1 | 2/2016 | Meriaz et al. |
| 2020/0311173 A1* | 10/2020 | Zhao .................. H04L 67/22 |
| 2021/0400353 A1* | 12/2021 | Sodagar .......... H04N 21/64322 |

FOREIGN PATENT DOCUMENTS

| | | |
|---|---|---|
| WO | WO-2010/096546 A1 | 8/2010 |
| WO | WO-2013/019003 A2 | 2/2013 |
| WO | WO-2014/179530 A1 | 11/2014 |

OTHER PUBLICATIONS

International Preliminary Examining Authority, Second Written Opinion for International Application No. PCT/US2014/036306, dated Apr. 1, 2015, (7 pages), European Patent Office, Rijswijk, The Netherlands.

International Searching Authority, International Search Report and Written Opinion for International Application No. PCT/US2014/036306, dated Jun. 30, 2014, (9 pages), European Patent Office, Rijswijk, The Netherlands.

Notice of Allowance and Fee(s) Due for U.S. Appl. No. 14/265,730, dated Apr. 11, 2017, (8 pages), United States Patent and Trademark Office, USA.

NonFinal Office Action for U.S. Appl. No. 14/265,730, dated Sep. 21, 2015, (11 pages), United States Patent and Trademark Office, USA.

Final Office Action for U.S. Appl. No. 14/265,730, dated Apr. 18, 2016, (11 pages), United States Patent and Trademark Office, USA.

NonFinal Office Action for U.S. Appl. No. 14/265,730, dated Dec. 23, 2016, (9 pages), United States Patent and Trademark Office, USA.

* cited by examiner

Callback Queue

| Queue # | Callback Number | Unique URL |
|---|---|---|
| 1 | 404-555-1234 | http://www.company.com/waittime1234 |
| 2 | 650-555-2345 | http://www.company.com/waittime2345 |
| 3 | 212-555-3456 | http://www.company.com/waittime3456 |
| 4 | 704-555-4567 | http://www.company.com/waittime4567 |
| 5 | 323-555-5678 | http://www.company.com/waittime5678 |
| 6 | 214-555-6789 | http://www.company.com/waittime6789 |

INBOUND AND OUTBOUND COMMUNICATION SESSION AND CALL CONTROL

BACKGROUND

The number of applications commonly stored and executed on mobile devices and other computing entities has exploded. With that said, users may decide to download and install applications for third parties regardless of what functionality is available through the applications. Irrespective of whether third party applications are stored on a particular mobile device or computing entity, third parties may desire to direct or control various aspects associated with inbound and/or outbound calls from and to the third parties.

BRIEF SUMMARY

In general, embodiments of the present invention provide methods, apparatus, systems, computing devices, computing entities, and/or the like for providing content via an internet-based connection between a third-party system and a mobile device that is established at least in part via a unique uniform resource locator (URL) that is transmitted via a text-message or other phone-based communication protocol to a callback number, and that enables a user of the mobile device that receives the message to access a webpage or other content linked with the unique URL to thereby establish an internet-based communication channel between the mobile device and the third-party system.

Certain embodiments are directed to a method for initializing a supplemental communication session relating to a telephone call, the method comprising: connecting, by one or more remote computing entities, to a voice call with a mobile device; receiving, by the one or more remote computing entities and via the voice call, a callback request; receiving, by the one or more remote computing entities, a callback number associated with the mobile device; generating, by the one or more remote computing entities, a unique uniform resource locator (URL) and graphical user interface (GUI) accessible via the unique URL for the callback request; determining, by the one or more remote computing entities, an estimated callback time for the callback request; dynamically updating, by the one or more remote computing entities, the GUI to include the determined estimated callback time; transmitting a message from the one or more remote computing entities to the mobile device including the unique URL; and providing the GUI to the mobile device upon the unique URL being activated at the mobile device.

In certain embodiments, determining an estimated callback time comprises: generating a callback entry within a callback queue, wherein the callback entry comprises at least one of: the callback number or the unique URL; determining a number of callbacks higher than the callback entry within the callback queue; determining an estimated duration for each of the number of callbacks higher than the callback entry; and estimating the callback time based at least in part on a combined duration of the number of callbacks higher than the callback entry. In various embodiments, the method further comprises: initiating the callback to the callback number; and updating the callback queue to remove the callback entry. In certain embodiments, the method further comprises deleting the unique URL after initiating the callback to the callback number. In various embodiments, the method further comprises: based at least in part on the callback number, identifying a user account associated with the callback number, wherein the user account is one of a plurality of user accounts stored in a memory accessible to the one or more remote computing entities; and updating data associated with the user account to comprise the estimated callback time. In certain embodiments, transmitting a message to the mobile device comprises transmitting a text message to the mobile device. In certain embodiments, the one or more remote computing entities comprises a third-party system and a call management computing entity, and wherein generating the unique URL and the GUI comprises: transmitting, from the third-party system to the call management computing entity, the callback number; and generating the unique URL and GUI accessible via the unique URL by the call management computing entity.

Certain embodiments are directed to a remote computing system comprising at least one processor, at least one communication interface, and at least one memory including program code, the at least one memory and the program code configured to, with the processor, cause the remote computing system to at least: connect to a voice call with a mobile device; receive, via the voice call, a callback request; receive a callback number associated with the mobile device; generate a unique uniform resource locator (URL) and graphical user interface (GUI) accessible via the unique URL for the callback request; determine an estimated callback time for the callback request; dynamically update the GUI to include the determined estimated callback time; transmit a message to the mobile device including the unique URL; and providing the GUI to the mobile device upon the unique URL being activated at the mobile device.

In certain embodiments, determining an estimated callback time comprises: generating a callback entry within a callback queue, wherein the callback entry comprises at least one of: the callback number or the unique URL; determining a number of callbacks higher than the callback entry within the callback queue; determining an estimated duration for each of the number of callbacks higher than the callback entry; and estimating the callback time based at least in part on a combined duration of the number of callbacks higher than the callback entry. In various embodiments, the at least one memory and the program code are further configured to, with the processor, cause the remote computing system to: initiate the callback to the callback number; and update the callback queue to remove the callback entry. In various embodiments, wherein the at least one memory and the program code are further configured to, with the processor, cause the remote computing system to delete the unique URL after initiating the callback to the callback number. In certain embodiments, the at least one memory and the program code are further configured to, with the processor, cause the remote computing system to: based at least in part on the callback number, identify a user account associated with the callback number, wherein the user account is one of a plurality of user accounts stored in a memory accessible to the one or more remote computing entities; and update data associated with the user account to comprise the estimated callback time. In certain embodiments, transmitting a message to the mobile device comprises transmitting a text message to the mobile device. In certain embodiments, the remote computing system further comprises a third-party system and a call management computing entity, and wherein generating the unique URL and the GUI comprises: transmitting, from the third-party system to the call management computing entity, the callback number; and generating the unique URL and GUI accessible via the unique URL by the call management computing entity.

Certain embodiments are directed to a computer program product for initializing a supplemental communication session relating to a telephone call, the computer program product comprising at least one non-transitory computer-readable storage medium having computer-readable program code portions stored therein for execution by the mobile device, the computer-readable program code portions comprising: an executable portion configured to connect to a voice call with a mobile device; an executable portion configured to receive, via the voice call, a callback request; receiving, by the one or more remote computing entities, a callback number associated with the mobile device; an executable portion configured to generate a unique uniform resource locator (URL) and graphical user interface (GUI) accessible via the unique URL for the callback request; an executable portion configured to determine an estimated callback time for the callback request; an executable portion configured to dynamically update the GUI to include the determined estimated callback time; an executable portion configured to transmit a message to the mobile device including the unique URL; and an executable portion configured to provide the GUI to the mobile device upon the unique URL being activated at the mobile device.

In certain embodiments, determining an estimated callback time comprises: generating a callback entry within a callback queue, wherein the callback entry comprises at least one of: the callback number or the unique URL; determining a number of callbacks higher than the callback entry within the callback queue; determining an estimated duration for each of the number of callbacks higher than the callback entry; and estimating the callback time based at least in part on a combined duration of the number of callbacks higher than the callback entry.

In various embodiments, the computer program product further comprising an executable portion configured to initiate the callback to the callback number; and an executable portion configured to update the callback queue to remove the callback entry. In various embodiments, the computer program product further comprises an executable portion configured to delete the unique URL after initiating the callback to the callback number. In certain embodiments, the computer program product further comprises an executable portion configured to, based at least in part on the callback number, identify a user account associated with the callback number, wherein the user account is one of a plurality of user accounts stored in a memory accessible to the one or more remote computing entities; and an executable portion configured to update data associated with the user account to comprise the estimated callback time. In various embodiments, transmitting a message to the mobile device comprises transmitting a text message to the mobile device.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Telephonic communications, particularly those between a business (e.g., a customer-facing business) and a customer have historically failed to take full advantage of the myriad technical advances that have been introduced to mobile telephonic devices (e.g., smartphones with internet connectivity) and therefore telephonic communications have been limited in functionality that is provided purely over the voice-based communication channels that characterize telephonic-based calls. To provide enhanced functionality of devices in relation to voice-based calls, such as providing visual-based information relating to a call (e.g., an amount of time until a caller is expected to receive a callback when a callback was requested. For example, upon a caller (also referred to herein as a user) requesting a callback during a telephonic call with a third-party system (e.g., requesting a callback by a human representative), the third-party system and/or a call management computing entity in communication with the third-party system generates a unique uniform resource locator (URL) and webpage (or other graphical user interface (GUI)) corresponding to the call, and transmits a message including the unique URL to the phone number requested for the callback. The third-party system additionally adds the callback number to a callback queue and calculates an estimated time for the callback. The estimated time is provided into the webpage associated with the unique URL, such that the user can access data providing an indication of an expected callback time, even after the call has been disconnected. The configurations discussed herein are usable regardless of whether the mobile device user is the caller (the individual that initiated a call to the third-party system) or the callee (the individual that received a call initiated by the third-party system).

Technical Problem

Telephonic based communication channels are sufficiently disconnected from other, internet-based communication channels that cross-linking between internet-based communication channels and telephone-based communication channels has generally been impossible. Telephone-based communications are voice-based, without direct opportunity for passing visual text or other non-audio data between participants. Moreover, telephone-based communications can occur between a plurality of different devices, including some internet-connected devices and some non-connected devices (e.g., traditional landlines) and thus, the opportunity for initiating alternative communication channels is not universal, creating barriers to universal application of technologies for initiating alternative communication channels for telephone calls.

In instances in which a caller to a third party is given a selection of waiting on hold for an available representative to hold a telephone conversation with the caller, or for the third party to call the user back (a representative of the third party to call back the user), the third party may provide an estimated time for a callback during the initial call on which the user requests the callback (e.g., via an audio-based indication of an initial estimated callback time). However, as the callback time estimate changes (e.g., as a callback queue changes) after the user hangs-up to await the callback, the third party traditionally cannot provide updated information of estimated callback times to the user because the voice-based phone call has been disconnected.

Technical Solution

To address the above-mentioned technological challenges, among others, various embodiments implement computing systems that generate GUIs and unique URLs for each requested callback (e.g., corresponding to a phone number provided to be used for a callback). The unique URL is then transmitted to the callback number (e.g., as a text message), thereby enabling a user of the mobile device associated with the callback number to access unique content corresponding to the requested callback as presented visually on the webpage (or other GUI) linked with the unique URL. Content accessible via the unique URL may be updated, such as to reflect an updated callback time when the user can expect to receive a callback from the third party, and the content remains accessible to the user even after the user ends the initial call during which he/she requested the later callback.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 1:
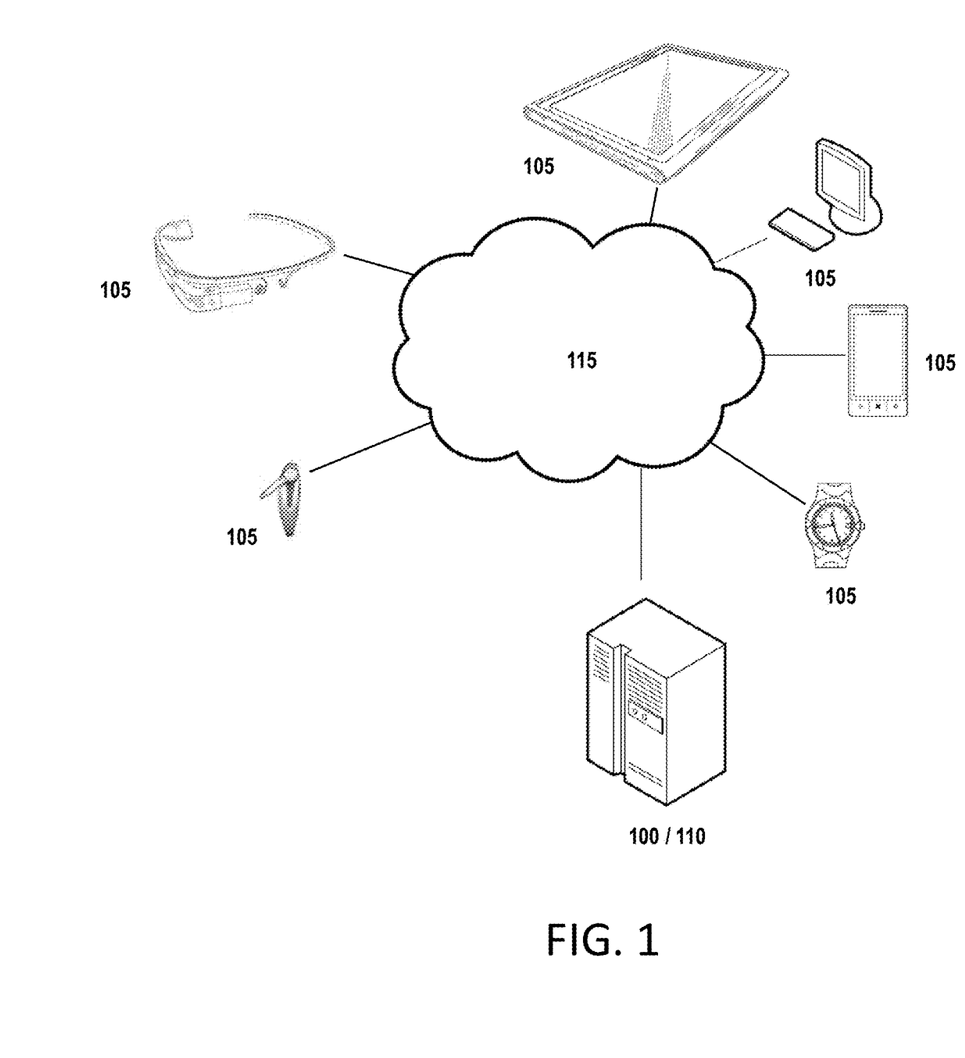
FIG. 1 is a diagram of a system architecture that can be used to practice embodiments of the present disclosure.

FIG. 1 provides a diagram of a system architecture that can be used to practice various embodiments of the present invention. As shown in FIG. 1, the system architecture may include one or more call management computing entities 100, one or more mobile devices 105, one or more third-party systems 110, and one or more networks 115. The call management computing entities 100, third-party systems 110, a computing entity of an operator, and/or other computing entities other than the mobile devices 105 may be referred to herein as remote computing entities. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Call Management Computing Entity

Figure 2:
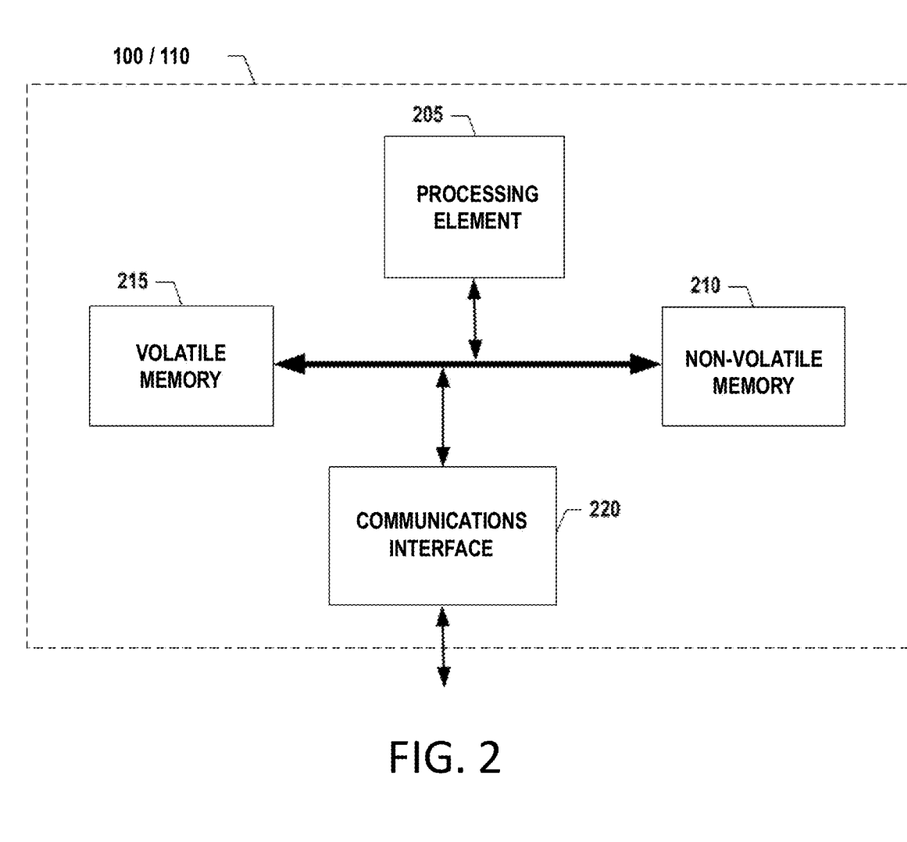
FIG. 2 is an exemplary schematic diagram of a computing entity according to one embodiment of the present invention.

FIG. 2 provides a schematic of a call management computing entity 100 according to one embodiment of the present invention. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the call management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the call management computing entity 100 may include or be in communication with one or more processing elements 205 (also referred to as processors, processing circuitry, and/or similar terms used herein interchangeably) that communicate with other elements within the call management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the call management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the call management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the call management computing entity 100 with the assistance of the processing element 205 and operating system.

As indicated, in one embodiment, the call management computing entity 100 may also include one or more communications interfaces 220 for communicating with or various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the call management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, Bluetooth protocols, wireless universal serial bus (USB) protocols, and/or any other wireless protocol. Via such communication protocols, the call management computing entity 100 can communicate with the mobile device 105, the third-party system 110, and/or various other computing entities.

Although not shown, the call management computing entity 100 may include or be in communication with one or more input elements, such as a keyboard input, a mouse input, a touch screen/display input, audio input, pointing device input, joystick input, keypad input, and/or the like. The call management computing entity 100 may also include or be in communication with one or more output elements (not shown), such as audio output, video output, screen/display output, motion output, movement output, and/or the like.

As will be appreciated, one or more of the computing entity's 100 components may be located remotely from other call management computing entity 100 components, such as in a distributed system. Furthermore, one or more of the components may be combined and additional components performing functions described herein may be included in the call management computing entity 100. Thus, the call management computing entity 100 can be adapted to accommodate a variety of needs and circumstances.

2. Exemplary Mobile Device

Figure 3:
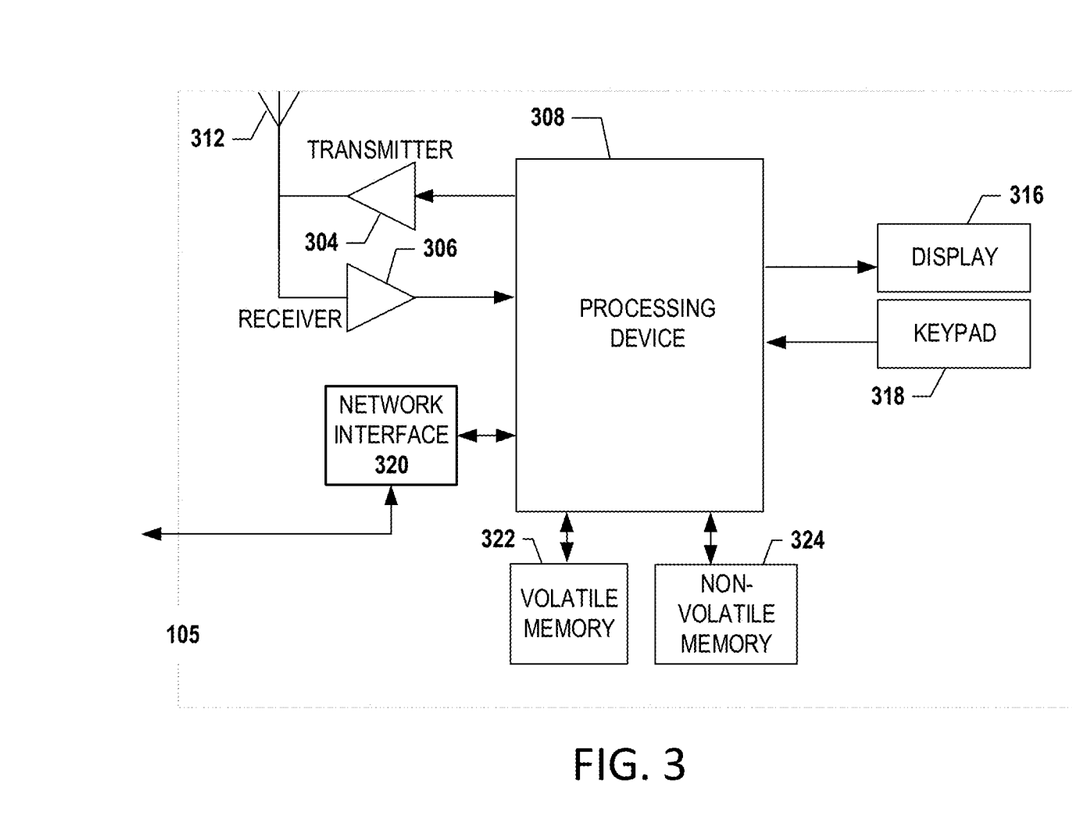
FIG. 3 is an exemplary schematic diagram of a mobile device according to one embodiment of the present invention.

FIG. 3 provides an illustrative schematic representative of a mobile device 105 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the mobile device 105 can include an antenna 312, a transmitter 304 (e.g., radio), a receiver 306 (e.g., radio), and a processing element 308 (such as those described above with regard to the call management computing entity 100) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the mobile device 105 may be capable of operating with one or more air interface standards, communication protocols, modulation types, and access types. More particularly, the mobile device 105 may operate in accordance with any of a number of wireless communication standards and protocols, such as those described above with regard to the call management computing entity 100. In a particular embodiment, the mobile device 105 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, Bluetooth, USB, and/or the like. Via such communication protocols, the mobile device 105 can communicate with the call management computing entity 100, the third-party system 110, and/or various other computing entities.

Via these communication standards and protocols, the mobile device 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile device 105 can also download changes, add-ons, and updates, for instance, to its firmware, software (e.g., including executable instructions, applications, program modules), and operating system. In one embodiment, the mobile device 105 may be executing an application initiating program that is resident on the mobile device 105. In one embodiment, the application initiating program may comprise, be associated with, or be in communication with an application initiating database. The application initiating program may also be associated with or be in communication with the call management computing entity 100 that comprises an application initiating database.

According to one embodiment, the mobile device 105 may include location determining aspects, devices, modules, functionalities, and/or similar words used herein interchangeably. For example, the mobile device 105 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the mobile device's 105 position in connection with a variety of other systems, including cellular towers, Wi-Fi access points, and/or the like. Similarly, the mobile device 105 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile device 105 may also comprise a user interface (that can include a display 316 coupled to a processing element 308) and/or a user input interface (coupled to a processing element 308). The user input interface can comprise any of a number of devices allowing the mobile device 105 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 105.

In another embodiment, the mobile device 105 may include one or more components that are functionally similar to those of the call management computing entity 100, as described in greater detail above.

3. Exemplary Third-Party System

A third-party may be an individual, a family, a company, an organization, an entity, a department within an organization, a representative of an organization and/or person, and/or the like. In one embodiment, each third-party system 110 may include one or more components that are functionally similar to those of the call management computing entity 100 and/or the mobile device 105. For example, each third-party system 110 may include one or more processing elements, one or more display device/input devices (e.g., including user interfaces), volatile and non-volatile storage or memory, and/or one or more communications interfaces. This may enable to the third-party system 110 to communicate with various other computing entities, such as call management computing entities 100, mobile devices 105, and/or various other computing entities. These architectures are provided for exemplary purposes only and are not limiting to the various embodiments. The term computing entity may refer to one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions described herein.

It should also be understood that the third-party system 110 may serve as the call management computing entity 100 in particular embodiments. For example, a third party may implement various embodiments of the invention within its own systems and/or environment. Therefore, in these particular embodiments, third-party system 110 may perform the functionality of the call management computing entity 100 as detailed herein.

III. Exemplary System Operation

Figure 4:
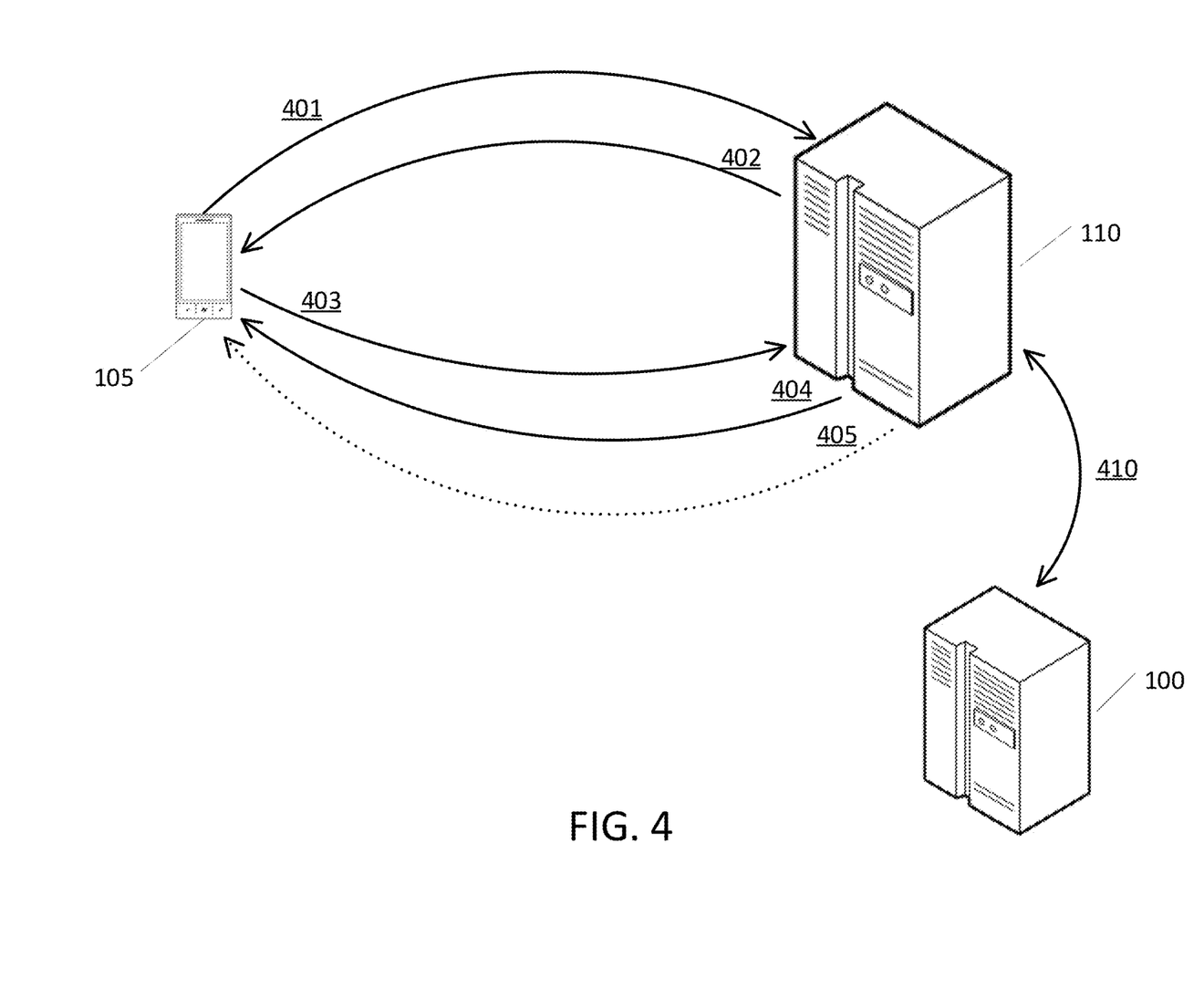
FIG. 4 is a schematic of communication channels between various entities in accordance with various embodiments.
Figure 5:
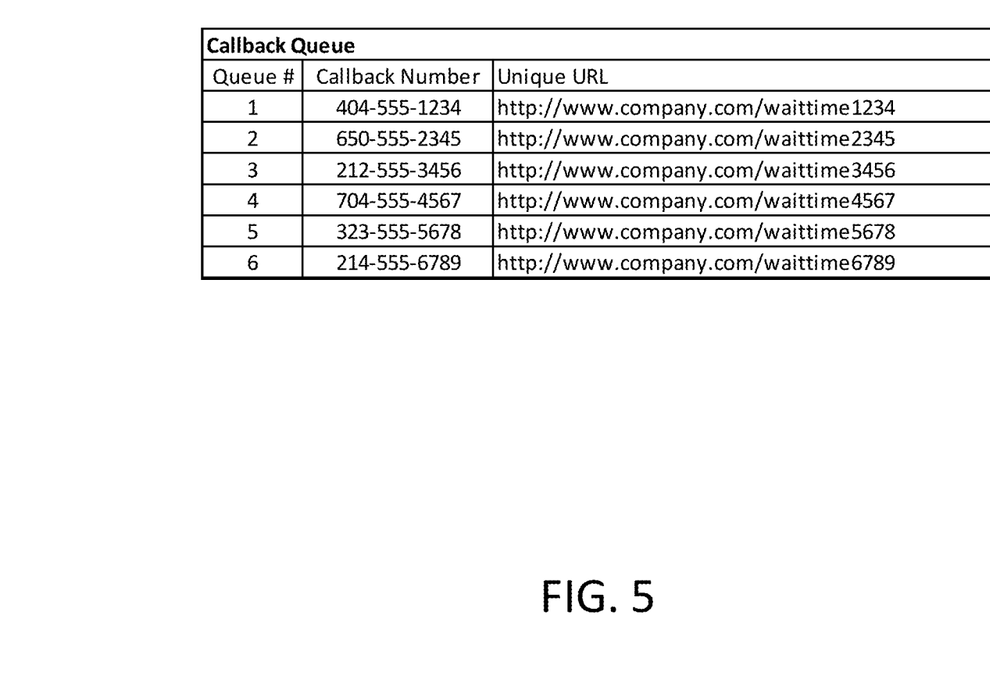
FIG. 5 is a data structure storing a callback queue in accordance with various embodiments.
Figure 6:
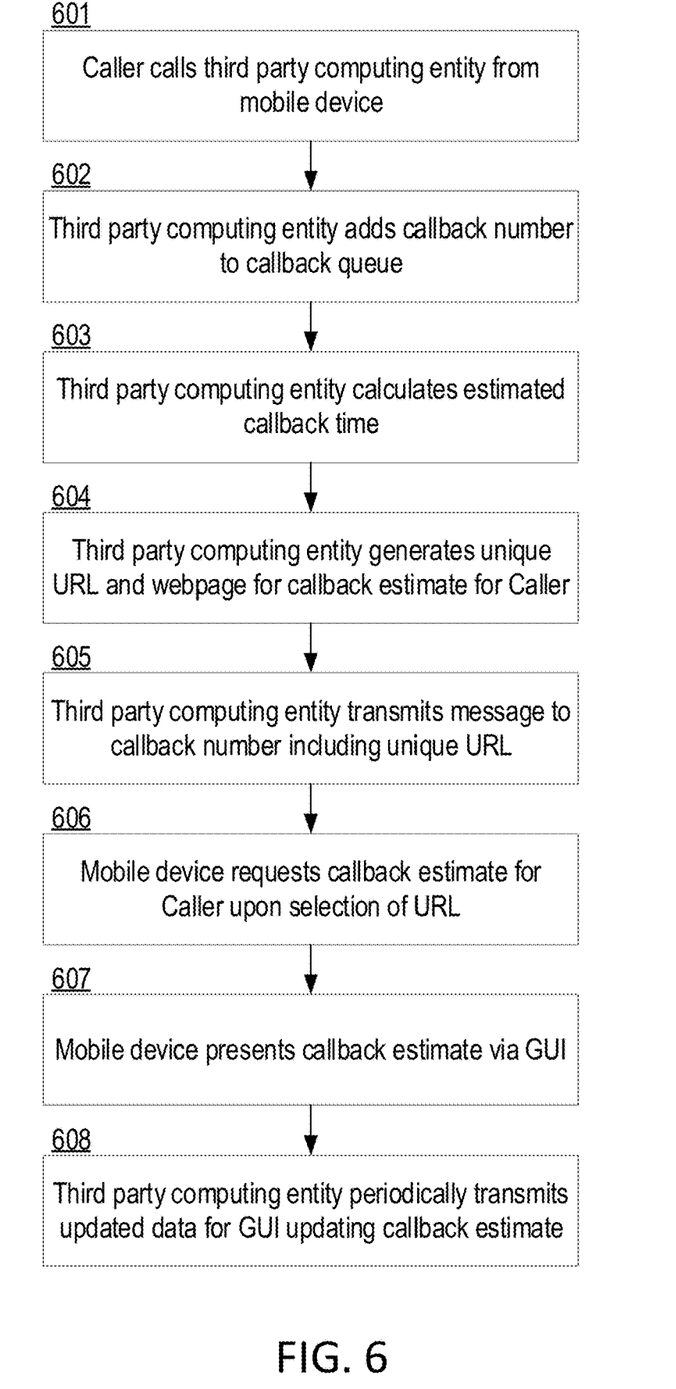
FIG. 6 is a flowchart illustrating operations and processes that can be used in accordance with various embodiments.
Figure 7:
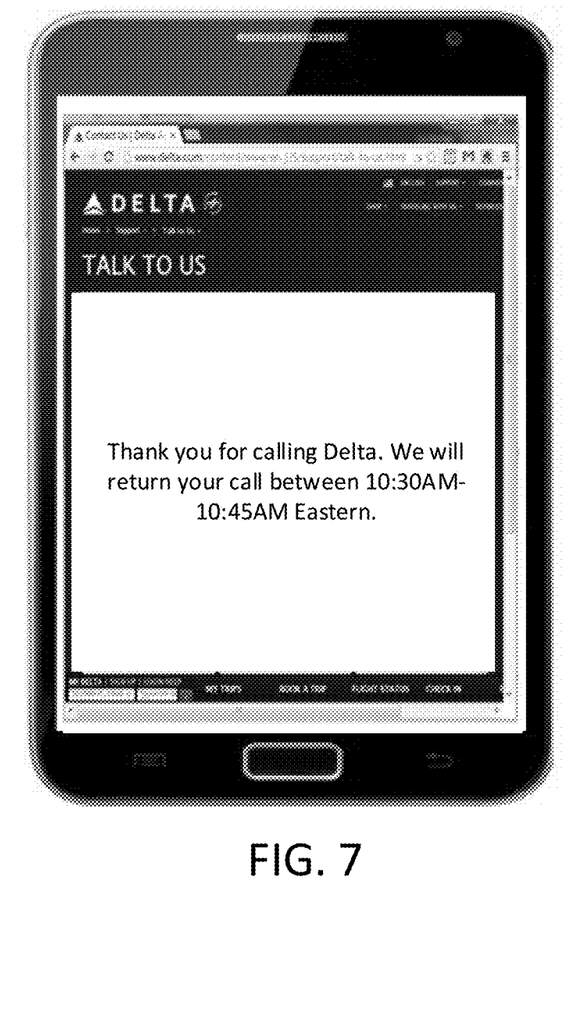
FIG. 7 shows an example output graphical user interface (GUI) produced by various embodiments.

Reference will now be made to FIGS. 4-7. FIG. 4 schematically depicts data transfers between devices in accordance with one embodiment. FIG. 5 illustrates example content within a callback queue. FIG. 6 illustrates an example flowchart of steps for establishing an internet-based communication channel between a third-party system and a mobile device, and FIG. 7 illustrates an example GUI that may be presented to provide content to the mobile device.

1. Registration

To take advantage of the features described herein, a third party may need to register for services with a call management computing entity 100. The services provided by the call management computing entity 100 may be provided on a fee basis, a subscription basis, a pay-per-use basis, and/or the like. As will be recognized, a variety of other approaches and techniques can be used to adapt to various needs and circumstances. For example, as previously discussed, a third party may implement the functionality of the call management computing entity 100 (or entity similar thereof) within its own systems without the need of an external entity to provide the services of the call management computing entity 100 (e.g., the third-party system 110 may serve as the call management computing entity 100 in various embodiments).

As part of or after registration, the third-party (e.g., operating a third-party system 110) may provide one or more telephone numbers (e.g., one or more target telephone numbers) associated with the third party and for which the third party would like mobile devices 105 (e.g., executing application initiation programs) to perform certain actions before, simultaneous to, during, and/or after calling or receiving a call from such numbers. The target telephone numbers provided by the third-party may be stored by the call management computing entity 100 and/or may be stored locally on one or more mobile devices 105. For example, Delta the airline may be registering and while registering, provide a target telephone number of 1-404-773-0305. As will be recognized, a third party is not limited to providing a single telephone number; rather, multiple telephone numbers (e.g., target telephone numbers) may be registered. The telephone numbers may include country codes, area codes, region codes, and/or the like.

The third party (via the third-party system 110) may request that the call management computing entity 100 intercept certain calls (calls originating from a mobile device 105 to one of the target telephone numbers), such that the call management computing entity 100 performs various operations, such as placing the caller (the mobile device 100 and the callback number) into a callback queue, determining an estimated callback time for the caller, and providing the caller with access to a GUI comprising a visual representation of the estimated callback time for the caller (e.g., by sending a text to the callback number including a unique URL generated for the caller's callback request; by updating an account known to be associated with the callback number to encompass data reflective of the estimated callback time such that the estimated callback time may be accessible via a GUI accessible via the caller's account; and/or the like).

In other embodiments, the third party (via the third-party system 110) may request that the call management computing entity 100 perform certain tasks associated with the operations discussed herein on behalf of the third-party system 110, but without any direct communication between the call management computing entity 100 and the mobile device 105. For example, the third party (via the third-party system 110) may request that the call management computing entity 100 only communicate with the third-party system 110, such as via an Application Program Interface (API). Under such configurations, the third-party system 110 provides relevant data regarding initiated communication sessions to the call management computing entity 100, and the call management computing entity 100 provides instructions to the third-party system 110 for communicating with the mobile device 105.

Particularly for those embodiments in which the third party requests that the call management computing entity 100 intercept calls and to perform operations as discussed herein, the third party may define and provide one or more callback rules to be implemented by the call management computing entity 100. The one or more callback rules may define one or more formulas, time-dependent rules, timing models, and/or the like to be utilized for calculating an estimated callback time for a particular caller within a callback queue. The one or more callback rules may be entirely independent of realtime, near realtime, or historical data (e.g., recent historical data) that may be generated by the third-party system 110 (e.g., data regarding recent/ current average call durations) and these rules may encompass stagnant callback estimation rules (e.g., assuming a fixed time duration for all calls). In other embodiments, the callback rules may utilize realtime data indicative of a rolling average call duration for calls with the third party, so as to provide updated estimated callback time estimates. It should be understood that other callback time estimates may be utilized as defined at least in part by the third party.

In addition to the one or more target telephone numbers and/or the callback rules, the third-party may additionally define one or more supplemental communication session rules to be utilized for the call management computing entity 100 to utilize when initiating a supplemental communication session with a mobile device 105. For example, the supplemental communication session rules may define rules for generating unique URLs to be provided to the mobile device 105, rules for causing generation of a webpage (or other data store portion) to be associated with the unique URL (e.g., formatting rules for the generated webpage to ensure the webpage is consistent with other webpages of the third party, content rules for the generated webpage defining what content is to be included in the webpage, and/or the like). As yet another example, the supplemental communication session rules may define the content of messages to be provided to the mobile device 105 when providing the unique URL to the mobile device.

In particular embodiments, the target telephone numbers, communication session indicators, call control rules, and/or the like can be stored locally in a data structure such as, for example, a database accessible to the call management computing entity 100. The call management computing entity 100 (e.g., in communication with the third-party system 110) may update the data structure regularly, periodically, continuously, and/or in response to certain triggers. In some embodiments, the data structure can be stored remotely from the third-party system 110 by the call management computing entity 100. In these particular embodiments, the third-party system 110 may need to communicate in real time or near real time with the call management computing entity 100 to determine/identify whether a supplemental communication session should be initiated with regard to a given phone number. As will be recognized, a variety of other approaches and techniques can be used to adapt to various needs and circumstances.

As mentioned above, functionality provided by the call management computing entity 100, such as providing messages directing mobile devices to supplemental communication channels, may be performed directly by the call management computing entity 100 or indirectly, by the third-party system 110 based at least in part on instructions/ data communicated between the third-party system 110 and the call management computing entity 100 (e.g., via an API-based communication). For functionality performed directly by the call management computing entity 100, registration may entail informing an operator (e.g., a telephone service provider) of the third party that calls made to specific numbers are to be intercepted and redirected to the call management computing entity 100. In other embodiments, a session initiation protocol (SIP)-based calling network may be utilized by the third-party system 110, enabling the third-party system 110 and/or the call management computing entity 100 to intercept and redirect calls made to specific numbers to the call management computing entity 100. For functionality performed by the third-party system 110 based at least in part on communications with the call management computing entity 100, registration entails establishment of the API-based communication channel between the third-party system 110 and the call management computing entity 100 enabling the third-party system 110 and the call management computing entity 100 to communicate contextual data of received calls, thereby enabling the call management computing entity 100 to execute appropriate callback estimation models and/or to provide instructions to the third-party system 110 to transmit messages to the mobile device 105 to initiate a supplemental communication session.

2. Communication Session Initiation

A supplemental communication session may be initiated based on a call placed by a user from a mobile device 105 or based on a call received by a user via a mobile device 105. For instance, a mobile device 105 places an outbound call to a third-party system 110 or receives an inbound call from the third-party system 110 (as reflected by line 401 in FIG. 4 and block 601 in FIG. 6; it should be understood that these figures specifically focus on circumstances in which the caller calls the third party, identical functionality can be provided for a phone call placed by the third-party system 110 to the mobile device 105).

In certain embodiments, the connection of a phone call between the mobile device 105 and the third-party system 110 (or between the mobile device 105 and the call management computing entity 100) may itself trigger processes for placing the caller into a callback queue and for providing estimates of a callback time to the caller. In other embodiments, the caller is not placed into a callback queue unless and until the caller navigates a voice-based communication session of one or more prompts on the call to request to speak with a representative, upon a determination that all available representatives are busy, and upon the third-party system 110 receiving an indication from the caller (e.g., via voice based prompts) that the caller would like a callback from the third party when a representative is available. Similar functionality is available upon the third-party system 110 initiating a call with the mobile device 105 and the caller navigating a presented voice prompt system to request to speak to a representative.

It should be understood that any process may be implemented that ultimately leads to the caller (also referred to as the user of the mobile device 105 as may be more relevant when the mobile device 105 receives the call) requesting a callback rather than waiting on hold for an available representative of the third party. Once a callback is requested, the additional processes for adding the caller to a callback queue, estimating a callback time, generating a unique URL, and transmitting the unique URL to the mobile device are performed as discussed herein.

As reflected at Block 602 of FIG. 6, the third-party system 110 adds the caller to a callback queue upon the caller requesting a callback. In certain embodiments, adding the caller to a callback queue entails determining a callback number for the callback. Determining the callback number may entail determining a number from which the caller is calling. However, determining the callback number may comprise receiving user input (e.g., via a touch-tone configuration or a voice-based prompt configuration) of the user providing a callback number for the callback.

The callback queue may be maintained by the third-party system 110 or the call management computing entity 100. Thus, in embodiments in which data must be exchanged between computing entities for adding a caller to the callback queue, such data exchange may be performed via an API-based communication channel (illustrated as line 410 in FIG. 4). For example, the third-party system 110 may receive a request to add the caller to the callback queue, and may determine the callback number to be associated with the caller. The third-party system 110 may then transmit, via the API-based communication channel, contextual data of the call, including the callback number, to the call management computing entity 100 as a part of a request to add the caller to the callback queue.

FIG. 5 illustrates example data that may be included in a callback queue, including a place in the queue for each requested callback (which may update for each requested callback as a callback higher in the queue is performed), the callback queue additionally comprises a callback number for each caller, and as discussed in greater detail herein, comprises a unique URL generated for each callback request. In certain embodiments, each unique URL may be used only once. In other embodiments, each unique URL may be unique to a particular callback number, such that the unique URLs may be reused each time a particular callback is requested for a particular callback number.

3. Callback Time Estimate

The third-party system 110 or the call management computing entity 100 determines an estimated time for a callback for the caller after placing the caller into the callback queue, as indicated at Block 603. Determining a callback estimate comprises executing a callback estimate model, which may be a stagnant model (for example, using a set wait time duration for each place within the callback queue) or a dynamic model (for example, utilizing a moving average call duration based at least in part on a recent history (e.g., most recent hour, most recent two hours, most recent day, and/or the like) to determine an estimated callback time based on the moving average estimate call duration and the number of calls that must be completed before reaching the caller's place in the callback queue. It should be understood that other modelling techniques may be utilized for estimating a callback time for a caller identified within the callback queue.

The callback queue is updated as representatives of the third party place calls to callback numbers reflected within the callback queue. As mentioned above, the third-party system 110 may encompass an SIP calling system or other network-based calling system in which representatives of the third party can easily access the callback queue and initiate calls from the callback queue (e.g., to the callback number at the top of the callback queue). Once a callback has been placed to a particular callback number, the entry corresponding to the callback number within the callback queue is removed, thereby moving all callback number entries lower in the callback queue up. The callback time estimate for each callback number entry remaining within the callback queue is updated, such that content to be provided via a webpage or other GUI accessible via the listed unique URL associated with the callback entry is updated to reflect the updated callback time estimate. It should be understood that other technologies may be utilized for updating the callback queue and/or removing entries from the callback queue as callbacks are placed by representatives of the third party.

Data indicative of the determined callback estimate may be stored in association with the callback queue entry associated with the caller (i.e., associated with the callback number), such that it may be referenced by a configuration for generating a GUI presenting the callback time estimate to a user. Moreover, it should be understood that the estimated callback time may be determined in terms of an estimated scheduled time (e.g., 10:30 AM eastern time), an estimated schedule time window (e.g., between 10:30-10:45 AM eastern time), a countdown time (e.g., a callback is estimated within 45 minute), or a countdown time window (e.g., a callback is estimated within 45-55 minutes).

4. Supplemental Communication Session

The callback estimate is provided to the caller as a part of a supplementary communication session occurring at least partially over the internet and/or other data-based communication networks. The callback estimate is provided at least in part via a GUI (e.g., provided without an audio-based counterpart), such that the user can quickly and easily check updated information about the estimated callback time for an expected callback from the third party without requiring an audio-based information source. To enable the third-party system to provide up-to-date (e.g., periodically updated) information about the estimated callback time for a caller, the third-party system establishes a supplemental communication session (to supplement the initial call) that may enable at least one-way information exchange from the third-party system 110 (or call management computing entity 100) to the mobile device 105, so that the third-party system 110 can provide updated information to the caller regarding the estimated callback time.

As a part of establishing the supplemental communication session, the third-party system 110 (or call management computing entity 100) generates a unique URL to be associated with the callback (as shown at Block 604 of FIG. 6). As mentioned in reference to FIG. 5, the generated unique URL may be stored within the callback queue in an entry associated with the callback number. The unique URL may direct to a GUI (e.g., a webpage, a section within an executable application on a mobile device 105, and/or the like) that provides a visual indication of a callback time estimate for the particular callback number (the callback time estimate being determined via the callback time model discussed above). Other content may be included within the GUI in addition to the callback time estimate. A non-limiting example of a GUI that may be linked via the unique URL is shown in FIG. 7. The example GUI of FIG. 7 provides a purely textual reflection of the estimated callback time, however it should be understood that non-text based graphical indications of an estimated callback time (e.g., a graphical depiction of a clock showing an estimated callback time or another image depicting an estimated callback time) may be utilized and/or incorporated into the generated GUI.

As indicated at Block 605 of FIG. 6 and line 402 of FIG. 4, the third-party system 110 (or call management computing entity 100) transmits a message including the unique URL to the mobile device 105. Specifically, the third-party system 110 (or call management computing entity 100) retrieves the callback number from the callback queue and transmits a message to the callback number within the callback queue including the unique URL corresponding to the callback number. The content of the message may be defined at least in part by content rules (e.g., the content rules may indicate that a message should state: "Thanks for Calling Us! Please use this link to see an updated time when we'll call you back."). Moreover, the content rules may indicate how the unique URL should be displayed, such as by embedding a hyperlink in one or more words of the message or including a separate text string reflecting the exact unique URL.

As mentioned, the unique URL may be configured such that, when a user of the mobile device 105 selects the unique URL within the provided message, the unique URL causes the mobile device 105 to initialize a browser on the mobile device 105 (or another application, such as an application specific to the third-party) and to direct the browser to a webpage associated with the unique URL which includes the GUI depicting the callback time estimate. As reflected at Block 606 of FIG. 6 and line 403 of FIG. 4, selecting the unique URL within the message causes the mobile device 105 (e.g., via an executing browser application) to request the GUI including the indication of the estimated callback time from the third-party system 110. As reflected at line 404 of FIG. 4, the third-party system 110 responds to the request by providing the GUI to the mobile device 105, causing the mobile device to display the GUI to the user, as reflected at Block 607 of FIG. 6. The third-party system 110 may thereafter provide periodic updates to the data reflected within the provided GUI, such as after the callback time model determines an updated callback time estimate for the caller or in response to an updated request for the GUI received from the mobile device 105 (e.g., after a user requests to refresh the webpage), as reflected at Block 608 of FIG. 6. The third-party system 110 provides those periodic updates to the mobile device 105 to cause the mobile device 105 to present current data reflecting a currently estimated callback time.

Although discussed above in reference to presenting a currently estimated callback time via a browser-accessible webpage, it should be understood that the data of an estimated callback time may be presented via other communication configurations, such as via GUIs of a third-party specific application. For example, selecting a unique URL may cause the mobile device 105 to first determine whether an applicable executable application is installed thereon. If the executable application is installed, the mobile device 105 initializes the application and presents a GUI via the specific application including the estimated callback time.

As yet another example, the estimated callback time may be accessible to a caller via a user account associated with the caller (as identified by the callback number). Upon a user requesting a callback (and providing a callback number), the third-party system 110 queries one or more data storage areas (e.g., databases) storing data regarding one or more user accounts. The one or more user accounts may comprise loyalty accounts, credit accounts, financial accounts, and/or the like. Data stored for each of the plurality accounts may comprise identifying data, such as a user identifier, a password, and/or the like. The data stored for each of the plurality of accounts additionally comprises one or more telephone numbers associated with the account, such that the third-party system can query the database to identify a match between a callback number provided during a telephonic interaction with the user and at least one phone number associated with a user account. Upon determining a match between the callback number and a phone number associated with a particular user account, the third-party system 110 links the unique URL generated for a callback with the user account, thereby providing the user with access to the unique URL via a user account portal accessible via a website or executable application (e.g., executable via the mobile device 105). As an example, a user may log into his/her user account, and a welcome page presented to the user after completion of the login process may include the unique URL and/or may include an indication of the expected callback time. As a specific example, the welcome page may include text stating: "Welcome back USER1! We see you are expecting a callback from us at 10:30 AM Eastern."

As shown in FIG. 7, the GUI providing information of an expected callback time may be passive, providing an indication of the expected callback time, without options for the user to interact with the GUI. In other embodiments, the GUI providing information of an expected callback time may be interactive, enabling a user to request a modification to the expected callback time. For example, the user may request to be moved up or down the callback queue or to be removed from the callback queue. In certain embodiments, requests to move up the callback queue (to receive an earlier callback) may be limited to certain users (e.g., users having a corresponding user account and/or satisfying other criteria, such as satisfying a particular status level within a loyalty program). Requests to move down the callback queue (to receive a later callback) and/or to be removed from the callback queue may be made available to other users. As yet other examples, the GUI providing information of an expected callback time may be integrated as a part of another GUI, such as a welcome screen for a user to login to an account associated with the third party, a screen providing the user with options for using other communication channels for communicating with the third party (e.g., initiating a web-based chat) instead of the callback, and/or the like.

Upon receipt of a valid request to move a user up or down the callback queue or to remove the user from the callback queue, the third-party system 110 adjusts the callback queue to accommodate the requested change, and the third-party system 110 recalculates callback time estimates for each user/callback number reflected within the callback queue. Data provided via the unique URL (e.g., the webpage or other GUI accessible via the unique URL) is updated to reflect the updated callback time.

In certain embodiments, the third-party system 110 and/or the call management computing entity 100 may be configured to transmit a plurality of messages to the callback number. For example, the third-party system 110 and/or the call management computing entity 100 may transmit a first message immediately after the user requests a callback. In certain embodiments, the third-party system 110 and/or the call management computing entity 100 may be configured to transmit a second message at a later time, such as once the estimated callback time is within a threshold amount of time. The second message, provided as a reminder of an upcoming callback, may be provided 5 minutes before an estimated callback time, 10 minutes before an estimated callback time, 30 minutes before an estimated callback time, 60 minutes before an estimated callback time, and/or the like. It should be understood that a plurality of reminder messages may be provided, such as at designated time intervals after the user requests a callback and/or at designated times prior to an expected callback time. In other embodiments, a reminder message may be sent to the callback number upon the estimated callback time being updated. For example, if an initial estimated callback time was 10:30 AM and the estimated callback time is subsequently updated to 11:00 AM (e.g., because one or more callers higher in the callback queue had calls longer than expected), the third-party system 100 and/or the call management computing entity 110 may transmit a reminder message to the callback. The reminder message may include text indicating that the callback time has been updated.

In any of the foregoing configurations, messages transmitted to the callback number (e.g., reminder messages, messages indicating a callback time has been updated, and/or the like) may include the unique URL linking to the webpage or other GUI including the callback time estimate.

In various embodiments, the unique URL as well as the associated webpage or other GUI is maintained temporarily, such as until the requested callback has occurred. As discussed above, a callback number and corresponding entry is removed from the callback queue once the callback is placed. Once the callback entry has been removed from the callback queue, the third-party system deletes and disables the unique URL as well as the linked webpage and/or other GUI. As mentioned, the unique URL may be regenerated later (e.g., for callback requests generated at a later time for the same callback number). In other embodiments, a unique URL is not reused after it has been disabled.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for initializing a supplemental communication session relating to a telephone call, the method comprising:
   connecting, by one or more remote computing entities, to a voice call with a mobile device;
   receiving, by the one or more remote computing entities and via the voice call, a callback request;
   receiving, by the one or more remote computing entities, a callback number associated with the mobile device;
   generating, by the one or more remote computing entities, a unique uniform resource locator (URL) and graphical user interface (GUI) accessible via the unique URL for the callback request;
   determining, by the one or more remote computing entities, an estimated callback time for the callback request;
   dynamically updating, by the one or more remote computing entities, the GUI to include the determined estimated callback time;
   transmitting a message from the one or more remote computing entities to the mobile device including the unique URL; and
   providing the GUI to the mobile device upon the unique URL being activated at the mobile device.

2. The method of claim 1, wherein determining an estimated callback time comprises:
   generating a callback entry within a callback queue, wherein the callback entry comprises at least one of: the callback number or the unique URL;
   determining a number of callbacks higher than the callback entry within the callback queue;
   determining an estimated duration for each of the number of callbacks higher than the callback entry; and
   estimating the callback time based at least in part on a combined duration of the number of callbacks higher than the callback entry.

3. The method of claim 2, further comprising:
   initiating the callback to the callback number; and
   updating the callback queue to remove the callback entry.

4. The method of claim 3, further comprising deleting the unique URL after initiating the callback to the callback number.

5. The method of claim 1, further comprising:
   based at least in part on the callback number, identifying a user account associated with the callback number, wherein the user account is one of a plurality of user accounts stored in a memory accessible to the one or more remote computing entities; and
   updating data associated with the user account to comprise the estimated callback time.

6. The method of claim 1, wherein transmitting a message to the mobile device comprises transmitting a text message to the mobile device.

7. The method of claim 1, wherein the one or more remote computing entities comprises a third-party system and a call management computing entity, and wherein generating the unique URL and the GUI comprises:
   transmitting, from the third-party system to the call management computing entity, the callback number; and
   generating the unique URL and GUI accessible via the unique URL by the call management computing entity.

8. A remote computing system comprising at least one processor, at least one communication interface, and at least one memory including program code, the at least one memory and the program code configured to, with the processor, cause the remote computing system to at least:
   connect to a voice call with a mobile device;
   receive, via the voice call, a callback request;
   receive a callback number associated with the mobile device;
   generate a unique uniform resource locator (URL) and graphical user interface (GUI) accessible via the unique URL for the callback request;
   determine an estimated callback time for the callback request;
   dynamically update the GUI to include the determined estimated callback time;

transmit a message to the mobile device including the unique URL; and providing the GUI to the mobile device upon the unique URL being activated at the mobile device.

9. The remote computing system of claim 8, wherein determining an estimated callback time comprises:

generating a callback entry within a callback queue, wherein the callback entry comprises at least one of: the callback number or the unique URL;

determining a number of callbacks higher than the callback entry within the callback queue;

determining an estimated duration for each of the number of callbacks higher than the callback entry; and estimating the callback time based at least in part on a combined duration of the number of callbacks higher than the callback entry.

10. The remote computing system of claim 9, wherein the at least one memory and the program code are further configured to, with the processor, cause the remote computing system to:

initiate the callback to the callback number; and update the callback queue to remove the callback entry.

11. The remote computing system of claim 10, wherein the at least one memory and the program code are further configured to, with the processor, cause the remote computing system to delete the unique URL after initiating the callback to the callback number.

12. The remote computing system of claim 8, wherein the at least one memory and the program code are further configured to, with the processor, cause the remote computing system to:

based at least in part on the callback number, identify a user account associated with the callback number, wherein the user account is one of a plurality of user accounts stored in a memory accessible to the one or more remote computing entities; and update data associated with the user account to comprise the estimated callback time.

13. The remote computing system of claim 8, wherein transmitting a message to the mobile device comprises transmitting a text message to the mobile device.

14. The remote computing system of claim 8, comprising a third-party system and a call management computing entity, and wherein generating the unique URL and the GUI comprises:

transmitting, from the third-party system to the call management computing entity, the callback number; and generating the unique URL and GUI accessible via the unique URL by the call management computing entity.

15. A computer program product for initializing a supplemental communication session relating to a telephone call, the computer program product comprising at least one non-transitory computer-readable storage medium having computer-readable program code portions stored therein for execution by the mobile device, the computer-readable program code portions comprising:

an executable portion configured to connect to a voice call with a mobile device;

an executable portion configured to receive, via the voice call, a callback request;

receiving, by the one or more remote computing entities, a callback number associated with the mobile device;

an executable portion configured to generate a unique uniform resource locator (URL) and graphical user interface (GUI) accessible via the unique URL for the callback request;

an executable portion configured to determine an estimated callback time for the callback request;

an executable portion configured to dynamically update the GUI to include the determined estimated callback time;

an executable portion configured to transmit a message to the mobile device including the unique URL; and an executable portion configured to provide the GUI to the mobile device upon the unique URL being activated at the mobile device.

16. The computer program product of claim 15, wherein determining an estimated callback time comprises:

generating a callback entry within a callback queue, wherein the callback entry comprises at least one of: the callback number or the unique URL;

determining a number of callbacks higher than the callback entry within the callback queue;

determining an estimated duration for each of the number of callbacks higher than the callback entry; and estimating the callback time based at least in part on a combined duration of the number of callbacks higher than the callback entry.

17. The computer program product of claim 16, further comprising:

an executable portion configured to initiate the callback to the callback number; and an executable portion configured to update the callback queue to remove the callback entry.

18. The computer program product of claim 16, further comprising an executable portion configured to delete the unique URL after initiating the callback to the callback number.

19. The computer program product of claim 15, further comprising:

an executable portion configured to, based at least in part on the callback number, identify a user account associated with the callback number, wherein the user account is one of a plurality of user accounts stored in a memory accessible to the one or more remote computing entities; and an executable portion configured to update data associated with the user account to comprise the estimated callback time.

20. The computer program product of claim 15, wherein transmitting a message to the mobile device comprises transmitting a text message to the mobile device.

* * * * *